US009055595B2

(12) United States Patent
Siomina et al.

(10) Patent No.: US 9,055,595 B2
(45) Date of Patent: Jun. 9, 2015

(54) BANDWIDTH-BASED CONFIGURATION OF MEASUREMENT GAPS

(75) Inventors: Iana Siomina, Solna (SE); Muhammad Kazmi, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 149 days.

(21) Appl. No.: 13/979,905

(22) PCT Filed: Jan. 12, 2012

(86) PCT No.: PCT/SE2012/050021
§ 371 (c)(1),
(2), (4) Date: Jul. 16, 2013

(87) PCT Pub. No.: WO2012/112103
PCT Pub. Date: Aug. 23, 2012

(65) Prior Publication Data
US 2013/0295958 A1 Nov. 7, 2013

Related U.S. Application Data

(60) Provisional application No. 61/443,120, filed on Feb. 15, 2011.

(51) Int. Cl.
*H04W 24/00* (2009.01)
*H04W 72/08* (2009.01)
(Continued)

(52) U.S. Cl.
CPC .......... *H04W 72/082* (2013.01); *G01S 5/0205* (2013.01); *G01S 5/0236* (2013.01);
(Continued)

(58) Field of Classification Search
CPC ... H04W 24/10; H04W 64/00; H04W 72/042; H04W 88/06; H04W 16/12; H04W 16/14; H04W 24/00; H04W 48/16; H04W 72/04

USPC ...................... 455/422.1, 423, 436–444, 447, 455/450–455, 456.1, 456.6, 509, 513, 516, 455/67.11, 115.1, 115.3, 226.1, 226.2

See application file for complete search history.

(56) References Cited

U.S. PATENT DOCUMENTS 5,276,907 A * 1/1994 Meidan ......................... 455/436
5,513,379 A * 4/1996 Benveniste et al. ........... 455/451
(Continued)

FOREIGN PATENT DOCUMENTS

GB 2469028 A 6/2010
WO 2009057729 A2 5/2009
(Continued)

*Primary Examiner* — Rafael Pérez-Gutiérrez
*Assistant Examiner* — Mark G. Pannell
(74) *Attorney, Agent, or Firm* — Coats & Bennett, PLLC

(57) ABSTRACT

Processing implemented by a method and apparatus herein advantageously improves the quality of measurements performed on non-serving frequencies and/or the quality of serving cell data reception by intelligently configuring measurement gaps during which a wireless device (36) is to perform those measurements. Such intelligent configuration entails obtaining (100) information that identifies, for each of a plurality of candidate non-serving frequencies, one or more measurement bandwidths over which one or more corresponding measurements on that non-serving frequency are to be performed. In at least some embodiments, such candidate non-serving frequencies represent frequencies for which the device (36) has requested measurements gaps. Regardless, processing further includes selecting (110) a subset of the candidate non-serving frequencies based on the measurement bandwidths. Processing finally includes configuring (120) measurement gaps during which the wireless device (36) is to perform one or more measurements on the selected non-serving frequencies.

17 Claims, 5 Drawing Sheets

(51) Int. Cl.
*G01S 5/02* (2010.01)
*H04W 24/10* (2009.01)
*H04W 36/00* (2009.01)
*H04W 72/12* (2009.01)
*H04W 64/00* (2009.01)

(52) U.S. Cl.
CPC ............ *H04W 24/10* (2013.01); *H04W 64/00* (2013.01); *H04W 24/00* (2013.01); *H04W 36/0094* (2013.01); *H04W 72/12* (2013.01); *H04B 17/27* (2015.01); *H04B 17/318* (2015.01); *H04B 17/382* (2015.01)

(56) References Cited

U.S. PATENT DOCUMENTS

| | | | | |
|---|---|---|---|---|
| 5,555,257 | A * | 9/1996 | Dent | 370/319 |
| 5,724,380 | A * | 3/1998 | Ritter | 375/135 |
| 5,812,940 | A * | 9/1998 | Lindell | 455/114.1 |
| 6,128,490 | A * | 10/2000 | Shaheen et al. | 455/434 |
| 2001/0022782 | A1 * | 9/2001 | Steudle | 370/335 |
| 2003/0032441 | A1 * | 2/2003 | Ofuji et al. | 455/525 |
| 2004/0162080 | A1 * | 8/2004 | Kostic et al. | 455/450 |
| 2004/0203815 | A1 * | 10/2004 | Shoemake et al. | 455/450 |
| 2005/0250529 | A1 | 11/2005 | Funnell et al. | |
| 2007/0298780 | A1 * | 12/2007 | Lindoff et al. | 455/423 |
| 2008/0081598 | A1 * | 4/2008 | Chandra et al. | 455/414.1 |
| 2009/0005029 | A1 * | 1/2009 | Wang et al. | 455/423 |
| 2009/0191863 | A1 | 7/2009 | Kazmi | |
| 2010/0317343 | A1 | 12/2010 | Krishnamurthy et al. | |
| 2010/0322079 | A1 * | 12/2010 | Kitazoe et al. | 370/241 |
| 2011/0009095 | A1 * | 1/2011 | Uemura et al. | 455/411 |
| 2011/0281615 | A1 * | 11/2011 | Yamada et al. | 455/524 |
| 2012/0046066 | A1 * | 2/2012 | Tamura et al. | 455/525 |
| 2012/0094651 | A1 * | 4/2012 | Chun et al. | 455/422.1 |
| 2012/0115459 | A1 * | 5/2012 | Deng et al. | 455/422.1 |
| 2012/0115463 | A1 * | 5/2012 | Weng et al. | 455/425 |
| 2012/0244903 | A1 * | 9/2012 | Fong et al. | 455/517 |
| 2012/0307670 | A1 * | 12/2012 | Kazmi et al. | 370/252 |
| 2012/0307769 | A1 * | 12/2012 | Fujita | 370/329 |
| 2013/0033998 | A1 * | 2/2013 | Seo et al. | 370/252 |

FOREIGN PATENT DOCUMENTS

| | | |
|---|---|---|
| WO | 2009096846 A1 | 8/2009 |
| WO | 2010151198 A1 | 12/2010 |
| WO | 2012112102 A1 | 8/2012 |

* cited by examiner

-- ASN1START

OTDOA-ProvideAssistanceData ::= SEQUENCE {
    otdoa-ReferenceCellInfo      OTDOA-ReferenceCellInfo          OPTIONAL,
    otdoa-NeighbourCellInfo      OTDOA-NeighbourCellInfoList      OPTIONAL,
    otdoa-Error                  OTDOA-Error                      OPTIONAL,
    ...
}

-- ASN1STOP

FIG. 2
*(PRIOR ART)*

BANDWIDTH-BASED CONFIGURATION OF MEASUREMENT GAPS

TECHNICAL FIELD

The present invention generally relates to measurements of cells in a wireless communication system, and particularly relates to configuring measurement gaps during which the device is to perform measurements of cells on non-serving frequencies.

BACKGROUND

The availability of several techniques and devices for identifying the geographical location of mobile device users has enabled a large variety of commercial and non-commercial services, such as navigation assistance, enhanced social networking, location-aware advertising, and location-aware emergency calls. However, different services may have different positioning accuracy requirements imposed by the application. In addition, some regulatory requirements on the positioning accuracy for basic emergency services exist in some countries, such as the FCC's E-911-related requirements in the United States.

In many environments, the position of a mobile device user can be accurately estimated by using positioning methods based on GPS (Global Positioning System) or other satellite-based system. Nowadays, wireless networks are often able to provide positioning-related assistance to mobile terminals (often referred to as user equipment, or UEs, or wireless terminals, mobile stations, or simply "mobiles") to improve the terminal's receiver sensitivity and GPS start-up performance. Several of these techniques are known as Assisted-GPS positioning, or A-GPS.

GPS or A-GPS receivers may not be available in all UE, however. Furthermore, GPS is known to fail in certain indoor environments and in urban "canyons" in the radio shadows caused by tall buildings. Complementary terrestrial positioning methods, such as one approach called Observed Time-Difference-of-Arrival (OTDOA), have therefore been standardized by the 3rd-Generation Partnership Project (3GPP) and are deployed in various wireless networks. In addition to OTDOA, the 3GPP standards for the so-called Long-Term Evolution (LTE) wireless system also specify methods, procedures and signalling support for techniques called Enhanced Cell ID (E-CID) and Assisted Global Navigation Satellite System (A-GNSS). Later, a network-based technique called Uplink Time-Difference-of-Arrival (UTDOA) may also be standardized for LTE.

Three key network elements for providing location services (LCS) in an LTE positioning architecture include the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in the LCS targets themselves. An LCS Client sends a request to LCS Server to obtain location information, and LCS Server processes and serves the received requests and sends the positioning result and optionally a velocity estimate to the LCS Client.

Position calculation can be conducted, for example, by a UE or by a positioning server, such as an Enhanced Serving Mobile Location Center, E-SMLC, or Secure User Plan Location (SUPL) Location Platform (SLP) in LTE. The former approach corresponds to the UE-based positioning mode, whilst the latter corresponds to the UE-assisted positioning mode.

Two positioning protocols operating via the radio network exist in LTE, LTE Positioning Protocol (LPP) and LPP Annex (LPPa). The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between evolved Node B (eNodeB) and LCS Server specified only for control-plane positioning procedures, although it still can assist user-plane positioning by querying eNodeBs for information and eNodeB measurements. SUPL protocol is used as a transport for LPP in the user plane. LPP has also a possibility to convey LPP extension messages inside LPP messages, e.g. currently Open Mobile Alliance (OMA) LPP extensions are being specified (LPPe) to allow e.g. for operator-specific assistance data or assistance data that cannot be provided with LPP or to support other position reporting formats or new positioning methods.

A high-level architecture of such an LTE system 10 is illustrated in FIG. 1. In FIG. 1, the system 10 includes a UE 12, a radio access network (RAN) 14, and a core network 16. The UE 12 comprises the LCS target. The core network 16 includes an E-SMLC 18 and/or an SLP 20, either of which may comprise the LCS Server. The control plane positioning protocols with the E-SMLC 14 as the terminating point include LPP, LPPa, and LCS-AP. The user plane positioning protocols with the SLP 16 as the terminating point include SUPL/LPP and SUPL. Although note shown, the SLP 20 may comprise two components, a SUPL Positioning Center (SPC) and a SUPL Location Center (SLC), which may also reside in different nodes. In an example implementation, the SPC has a proprietary interface with E-SMLC, and an Llp interface with the SLC. The SLC part of the SLP communicates with a P-GW (PDN-Gateway) 22 and an External LCS Client 24.

Additional positioning architecture elements may also be deployed to further enhance performance of specific positioning methods. For example, deploying radio beacons 26 is a cost-efficient solution which may significantly improve positioning performance indoors and also outdoors by allowing more accurate positioning, for example, with proximity location techniques.

To meet varying demands for different Location-Based Services (LBS), an LTE network will deploy a range of complementing methods characterized by different performance in different environments. Depending on where the measurements are conducted and where the final position is calculated, the methods can be UE-based, UE-assisted, or network-based, each with own advantages. The following methods are available in the LTE standard for both the control plane and the user plane: (1) Cell ID (CID), (2) UE-assisted and network-based E-CID, including network-based angle of arrival (AoA), (3) UE-based and UE-assisted A-GNSS (including A-GPS), and (4) UE-assisted OTDOA.

Several other techniques such as hybrid positioning, fingerprinting positioning and adaptive E-CID (AECID) do not require additional standardization and are therefore also possible with LTE. Furthermore, there may also be UE-based versions of the methods above, e.g. UE-based GNSS (e.g. GPS) or UE-based OTDOA, etc. There may also be some alternative positioning methods such as proximity based location. UTDOA may also be standardized in a later LTE release, since it is currently under discussion in 3GPP. Similar methods, which may have different names, also exist for radio-access technologies (RATs) other than LTE, such as CDMA, WCDMA or GSM.

With particular regard to the OTDOA positioning method, this method makes use of the measured timing of downlink signals received from multiple base stations (evolved NodeBs, or eNodeBs, in LTE) at the UE. The UE measures the timing of the received signals using assistance data received from the LCS server, and the resulting measurements are used to locate the UE in relation to the neighbouring eNodeBs.

More specifically, the UE measures the timing differences for downlink reference signals received from multiple distinct locations or neighboring cells. For each (measured) neighbor cell, the UE measures Reference Signal Time Difference (RSTD), which is a relative timing difference between the neighbor cell and a defined reference cell. The UE position estimate is then found as the intersection of hyperbolas corresponding to the measured RSTDs. At least three measurements from geographically dispersed base stations with a good geometry are needed to solve for two coordinates of the UE and the receiver clock bias. In order to solve for position, precise knowledge of the transmitter locations and transmit timing offset is needed.

To enable positioning in LTE and facilitate positioning measurements of a proper quality and for a sufficient number of distinct locations, new physical signals dedicated for positioning (positioning reference signals, or PRS) have been introduced and low-interference positioning subframes have been specified in 3GPP. Details are specified in 3GPP TS 36.211; as of February 2011, version 10.0.0 of this specification is available from http://www.3gpp.org.

PRS are transmitted from one antenna port of a base station according to a pre-defined pattern. A frequency shift, which is a function of Physical Cell Identity (PCI), can be applied to the specified PRS patterns to generate orthogonal patterns. The mapping of frequency shifts to PCT models an effective frequency reuse of six, which makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g. cell-specific reference signals (CRS) could be used for positioning measurements, in principle.

PRS are transmitted in pre-defined positioning sub-frames grouped by several consecutive sub-frames ($N_{PRS}$), i.e., one positioning occasion. Positioning occasions occur periodically with a certain periodicity of N subframes, i.e. the time interval between two positioning occasions. The standardized periods N are 160, 320, 640, and 1280 ms, and the number of consecutive subframes may be 1, 2, 4, or 6 [3GPP TS 36.211]. PRS configuration and PRS offset from System Frame Number 0 (SFN0) are determined by a PRS configuration index defined in [3GPP 36.211] and signalled in the OTDOA assistance data. The number of consecutive DL subframes and the PRS bandwidth (which may be smaller than the system bandwidth) may also be signalled in the OTDOA assistance data. Of course, signaling the PRS bandwidth in the assistance data is only useful if RSTD measurements are performed on PRS (as opposed to other reference signals).

PRS may also be muted, e.g., not transmitted. The positioning node informs the UE about whether PRS is muted or not, e.g., by signalling a cell-specific muting pattern which indicates PRS positioning occasions in which the UE is expected to perform measurements for the corresponding cell.

Information about such PRS and other information that will assist with positioning measurements is included in so-called assistance data. Different sets of assistance data are typically used for different methods. Regardless, the positioning assistance data is sent by the positioning server, or via some other node, to UEs or other radio nodes in order to assist with positioning measurements. For example, assistance data may be sent via LPP to an eNodeB for transmission to the UE. In this case, the transmission of assistance data may be transparent to the eNodeB and the Mobility Management Entity (MME). The assistance data may also be sent by the eNodeB via LPPa to a positioning server for further transfer to the UE. In some cases, the assistance data may be sent on request from a wireless device that needs to perform measurements. In other cases, the assistance data is sent in an unsolicited way.

Since for OTDOA positioning PRS signals from multiple distinct locations need to be measured, the UE receiver may have to deal with PRS that are much weaker than those received from the serving cell. Furthermore, without an approximate knowledge of when the measured signals are expected to arrive in time and what is the exact PRS pattern, the UE must perform signal search within a large window. This can impact the time and accuracy of the measurements as well as the UE complexity. To facilitate UE measurements, the network transmits assistance data to the UE, which includes, among other things, reference cell information, a neighbour cell list containing Physical Cell Identifiers (PCIs) of neighbour cells, the number of consecutive downlink subframes within a positioning occasion, PRS transmission bandwidth, frequency, etc.

In LPP, the OTDOA assistance data is provided within the Information Element (IE) OTDOA-ProvideAssistanceData, as shown in FIG. 2. Similar structures for OTDOA exist in LPPe.

The OTDOA assistance data includes information about the reference cell and neighbour cells for which OTDOA is to be determined. The neighbour cells may or may not be on the same frequency as the reference cell, and the reference cell may or may not be on the same frequency as the serving cell, and may or may not be the serving cell. Measurements that involve cells on a frequency different than the serving cell are inter-frequency measurements. Measurements on the same frequency as the serving cell are intra-frequency measurements. Different requirements apply for intra- and inter-frequency measurements.

Note that assistance data delivery is not required for UE- or eNodeB-assisted forms of E-CID positioning and this is not currently supported without EPDU elements. UE-based E-CID location is not currently supported, and the assistance data delivery procedure is not applicable to uplink E-CID positioning. No assistance data is currently specified for E-CID for LPP. Some assistance data, however, may be provided for E-CID e.g. via LPPe.

In this regard, with Open Mobile Alliance (OMA) LPP extension (LPPe), assistance data is enhanced with the possibility to assist a larger range of positioning methods (e.g. assistance data may also be provided for E-CID or other methods of other RATs, e.g. OTDOA UTRA or E-OTD GSM, or other PLMN networks). Furthermore, there is also a possibility of carrying over a black-box data container meant for carrying vendor-/operator-specific assistance data.

Also note that LTE specifications enable Frequency Division Duplex (FDD) and Time Division Duplex (TDD) operation modes. Additionally, half duplex operation is also specified, which is essentially FDD operation mode but with transmission and receptions not occurring simultaneously as in TDD. Half duplex mode has advantages with some frequency arrangements where the duplex filter may be unreasonable, resulting in high cost and high power consumption. Since carrier frequency number (EARFCN) is unique, by knowing it, it is possible to determine the frequency band, which is either FDD or TDD. However, it may be more difficult to find the difference between full duplex FDD and half-duplex FDD (HD-FDD) without explicit information since the same FDD band can be used as full FDD or HD-FDD.

Further, inter-frequency measurements may in principle be considered for any positioning method, even though currently not all measurements are specified by the standard as intra- and inter-frequency measurements. When performing inter-frequency measurement, the serving and target carrier frequencies may belong to the same duplex mode or to different duplex modes e.g. LTE FDD-FDD inter-frequency, LTE TDD-TDD inter-frequency, LTE FDD-TDD inter-frequency or LTE TDD-FDD inter-frequency scenario. The FDD carrier may operate in full duplex or even in half duplex mode. Examples of inter-frequency measurements currently specified by the standard are Reference Signal Time Difference (RSTD) used for OTDOA, RSRP and RSRQ which may be used e.g. for fingerprinting or E-CID.

In LTE, measurement gaps are configured by the network to enable inter-frequency measurements on the other LTE frequencies. The measurements may be done for various purposes: mobility, positioning, self organizing network (SON), minimization of drive tests, etc. Regardless, the gap configuration is signaled to the UE over the Radio Resource Control (RRC) protocol as part of the measurement configuration. A UE that requires measurement gaps for positioning measurements, e.g., OTDOA, may send an indication to the network, e.g. eNodeB, upon which the network may configure the measurement gaps. Furthermore, the measurement gaps may need to be configured according to a certain rule, e.g. inter-frequency RSTD measurements for OTDOA require that the measurement gaps are configured according to the inter-frequency requirements in 36.133, Section 8.1.2.6, e.g. not overlapping with PRS occasions of the serving carrier and using gap pattern #0.

In LTE, inter-RAT measurements (e.g., measurements on other RATs like UTRA, GSM, CDMA2000, etc) are typically defined similar to inter-frequency measurements. Indeed, they may also require configuring measurement gaps like for inter-frequency measurements. Although inter-RAT measurements often have more relaxed requirements and have more measurements restrictions, the same gap pattern is used for all types of inter-frequency and inter-RAT measurements. Therefore E-UTRAN must provide a single measurement gap pattern with constant gap duration for concurrent monitoring (i.e. cell detection and measurements) of all frequency layers and RATs.

As a special example of inter-RAT measurements there may also be multiple networks, which use the overlapping sets of RATs. The examples of inter-RAT measurements specified currently for LTE are UTRA FDD CPICH RSCP, UTRA FDD carrier RSSI, UTRA FDD CPICH Ec/No, GSM carrier RSSI, and CDMA2000 1x RTT Pilot Strength.

For positioning, assuming that LTE FDD and LTE TDD are treated as different RATs, the current standard defines inter-RAT requirements only for FDD-TDD and TDD-FDD measurements, and the requirements are different in the two cases. There are no other inter-RAT measurements specified within any separate RAT for the purpose of positioning and which are possible to report to the positioning node (e.g. E-SMLC in LTE).

It is mandatory for all UEs to support all intra-RAT measurements (including both inter-frequency and intra-band measurements) and meet the associated requirements. However the inter-band and inter-RAT measurements are UE capabilities, which are reported to the network during the call setup. The UE supporting certain inter-RAT measurements should meet the corresponding requirements. For example a UE supporting LTE and WCDMA should support intra-LTE measurements, intra-WCDMA measurements and inter-RAT measurements (i.e. measuring WCDMA when serving cell is LTE and measuring LTE when serving cell is WCDMA). Hence network can use these capabilities according to its strategy. These capabilities are highly driven by factors such as market demand, cost, typical network deployment scenarios, frequency allocation, etc.

Notably, in single carrier LTE, a cell may operate at channel bandwidths ranging from 1.4 MHz to 20 MHz. However, a single-carrier legacy UE shall be able to receive and transmit over 20 MHz, i.e., the maximum single-carrier LTE bandwidth. If the serving-cell bandwidth is smaller than 20 MHz, then the UE shortens the bandwidth of its radio frequency (RF) front end. For example, if the serving-cell bandwidth (BW) is 5 MHz, then the UE will likewise configure its RF BW to 5 MHz. This approach has several advantages. For example, it enables the UE to avoid noise outside the current reception bandwidth, and it saves UE battery life by lowering power consumption.

However, such reconfiguration of the UE reception and/or transmission bandwidth involves some delay, e.g., 0.5-2 ms, depending on UE implementation and also on whether both UL BW and DL BW are reconfigured at the same time or not. This small delay is often referred to as 'glitch'. During the glitch the UE cannot receive from the serving cell or transmit to the serving cell. Hence this may lead to interruption in data reception or transmission from or to the serving cell. The UE is also unable to perform any type of measurements during the glitch. The glitch occurs either when the UE extends its bandwidth (e.g. from 5 MHz to 10 MHz) or when it shortens its bandwidth (e.g. from 10 MHz to 5 MHz).

Furthermore, when the UE operates at a bandwidth lower than its maximum reception capability and the UE then wants to measure over a larger bandwidth, it has to open its receiver for performing the measurement. Thus, in this case (i.e. when current BW<max BW) the glitch occurs before and after the UE obtains each measurement sample, if the UE reconfigures back to its current operation after each measurement sample over the larger bandwidth.

The glitch also occurs when a UE capable of carrier aggregation (CA) reconfigures its bandwidth from single carrier to multiple carrier mode or vice versa. For example consider a UE that is capable of CA and that supports 2 downlink (DL) component carriers (CCs), each of 20 MHz, including a primary CC (PCC) and a secondary CC (SCC). If the secondary component carrier is deactivated by the serving/primary cell then the UE will shorten its BW e.g. from 40 MHz to 20 MHz. This may cause 1-2 ms interruption on the PCC.

According to current standards, the maximum allowed measurement bandwidth on a carrier frequency is defined by the parameter Transmission Bandwidth Configuration "$N_{RB}$" in 3GPP TS 36.104, which may take values of 6, 15, 25, 50, 75 and 100 resource blocks. The DL bandwidth information of a cell is signaled in the Mater Information Block (MIB) which the UE reads before it can camp on the cell; the UL bandwidth information, if different from the DL bandwidth information, may further be signaled in SystemInformationBlockType2 (SIB2) [3GPP TS 36.331].

For cell reselection, i.e., when the UE has to measure on neighbor cells, the cell re-selection parameters that are common for intra-frequency, inter-frequency and/or inter-RAT cell re-selection are signaled in SystemInformationBlockType3 (SIB3). The element intraFreqCellReselectionInfo of SIB3 contains the allowedMeasBandwidth element, which corresponds to the DL bandwidth for measurements on intra-frequency cells. If that element is absent, the DL measurement bandwidth for intra-frequency cells is assumed to be the same as that indicated by the dl-Bandwidth included in MIB. The allowed measurement bandwidth is not signaled per cell, since it is assumed to be the same as for the serving cell, which is signaled in MIB and SIB2.

The information relevant for inter-frequency cell reselection only may be signaled via SIB5, which includes cell re-selection parameters common for a frequency as well as cell specific re-selection parameters. The allowed measurement bandwidth information is signaled per frequency in the InterFreqCarrierFreqInfo element.

Thus, cell-specific bandwidth information currently is not provided for cell re-selection. Rather, bandwidth information for cell re-selection is only provided per carrier.

Other cell-specific information for cell re-selection is currently provided for intra-frequency cells or inter-frequency cells. For intra-frequency cells, the information is provided in the IntraFreqNeighCellInfo element, when a list of cells is signaled in SIB4. For inter-frequency cells, the information is provided in the InterFreqNeighCellInfo element, when a list of cells is included in InterFreqCarrierFreqInfo signaled in SIB5.

Further, a neighCellConfig element is used to indicate whether or not some configurations for a neighbor cell are the same as for the serving cell. This element with the current standard can be signaled as either a part of intraFreqCellReselectionInfo (in SIB3) or a part of InterFreqCarrierFreqInfo (in SIB5).

Note that the neighCellConfig element is used to indicate potential configuration differences among cells of a particular frequency, without cell details. Currently, the neighCellConfig element is used to provide only the information related to MBSFN and TDD UL/DL configuration of neighbour cells of such frequency. In particular, values for the neighCellConfig element include 00, 10, 01, and 11. A value of '00' indicates that not all neighbour cells have the same MBSFN subframe allocation as the serving cell on the frequency, if configured, and as the PCell otherwise. A value of '10' indicates that the MBSFN subframe allocations of all neighbour cells are identical to or subsets of that in the serving cell on this frequency, if configured, and of that in the PCell otherwise. A value of '01' indicates that no MBSFN subframes are present in all neighbour cells. Finally, a value of '11' indicates that there is a different UL/DL allocation in neighbouring cells for TDD compared to the serving cell on this frequency, if configured, and compared to the PCell otherwise. Note that, for TDD, 00, 10 and 01 are only used for the same UL/DL allocation in neighbouring cells compared to the serving cell on this frequency, if configured, and compared to the PCell otherwise.

In view of the above described details, a UE may need to measure reference signals transmitted by multiple cells, e.g., for performing positioning measurements. This proves problematic in certain circumstances. One problematic circumstance occurs when the multiple cells have different cell bandwidths. Another problematic circumstance occurs when one or more of the cells do not use the full cell bandwidth, such as when those cells are provided by beacon devices. Still another problematic circumstance occurs when the reference signals to be measured are transmitted in the multiple cells with different bandwidths (irrespective of the cell bandwidths of those cells). And yet another problematic circumstance occurs when the UE obtains different measurement bandwidth information for cells to be measured and thereby measures those cells over different bandwidths.

In all of these circumstances, the UE has to reconfigure the receiver to enable measurements of cells with a larger bandwidth, which may be necessary to meet e.g. measurement accuracy requirements with respect to those cells. This proves problematic because configuring a receiver to a larger bandwidth, to meet measurement accuracy requirements for cells with that larger bandwidth, may degrade measurement quality in other cells with either a smaller associated measurement bandwidth or with a smaller cell bandwidth. Configuring the receiver to a larger bandwidth may also prove problematic if that bandwidth is larger than the serving-cell bandwidth. Indeed, particularly where the measurements being performed are intra-frequency measurements, measuring cells over such large bandwidth degrades the quality with which the UE receives data from the serving cell over a smaller bandwidth.

Still further, positioning measurements may be performed periodically. For instance, OTDOA positioning measurements are performed in positioning subframes that occur in blocks of consecutive DL subframes and with periodicity of 160 ms, 320, 640 ms, or 1280 ms. Receiver reconfiguration to a new measurement bandwidth in certain subframes takes time, and reconfiguring it back to the normal-operation measurement bandwidth in normal subframes also takes time. This reconfiguration time reduces the total effective measurement time, which typically results in degraded measurement accuracy and/or data reception quality.

Moreover, when the network (eNodeB in LTE) configures measurement gaps for the UE to enable positioning measurements, there may also be some cells on inter-frequency(ies) or another RAT with a different transmission or measurement bandwidth of signals used for positioning. In some cases, e.g., when there are multiple frequencies and the signals for positioning occur at different time instances, the network (or eNodeB, in particular) may need to choose for which frequency the measurement gaps are to be configured. Known approaches fail to make a selection in this regard that would improve measurement accuracy and/or data reception quality.

SUMMARY

Embodiments herein advantageously improve the quality of measurements performed on non-serving frequencies and/or the quality of serving cell data reception by intelligently configuring measurement gaps during which a wireless device is to perform those measurements. Such intelligent configuration entails selecting only a subset of non-serving frequencies for which to configure measurement gaps, based on the bandwidth over which the associated measurements are to be performed. In at least some embodiments, the configuration further bases the selection on the serving-cell bandwidth.

More particularly, embodiments herein include a method and apparatus for configuring measurement gaps during which a wireless device is to perform measurements of one or more neighbor cells on one or more non-serving frequencies. Processing according to the method, in particular, entails obtaining information that identifies, for each of a plurality of candidate non-serving frequencies, one or more measurement bandwidths over which one or more corresponding measurements on that non-serving frequency are to be performed. In at least some embodiments, such candidate non-serving frequencies represent frequencies for which the device has requested measurements gaps. Regardless, processing further includes selecting, based on the measurement bandwidths, a subset of the candidate non-serving frequencies. Processing finally includes configuring measurement gaps during which the wireless device is to perform one or more measurements on the selected non-serving frequencies.

Thus, rather than configuring measurement gaps for all of the candidate non-serving frequencies, the processing configures measurement gaps for only a subset of one or more of those non-serving frequencies. And, notably, the processing does so intelligently based on information obtained regarding the bandwidths over which the associated measurements are to be performed.

In one or more embodiments, the subset of candidate non-serving frequencies for which to configure measurement gaps is selected so as to maximize the average bandwidth over which measurements will be performed. Indeed, performing measurements over a larger bandwidth in this way increases the quality and accuracy of those measurements.

In one or more other embodiments, the subset is advantageously selected based not only on the measurement bandwidths, but also on the serving-cell bandwidth, or more particularly based on the measurement bandwidths' relation to the serving-cell bandwidth. Such may entail preferentially selecting for inclusion in the subset candidate non-serving frequencies on which the most neighbor cells are to be measured over the serving-cell bandwidth. Or, this may entail preferentially selecting for inclusion in the subset candidate non-serving frequencies on which the most neighbor cells are to be measured over a bandwidth that does not exceed a defined threshold set based on the serving-cell bandwidth.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 illustrates the structure of the provideAssistance-Data element in the LPP protocol.

DETAILED DESCRIPTION

Figure 3:
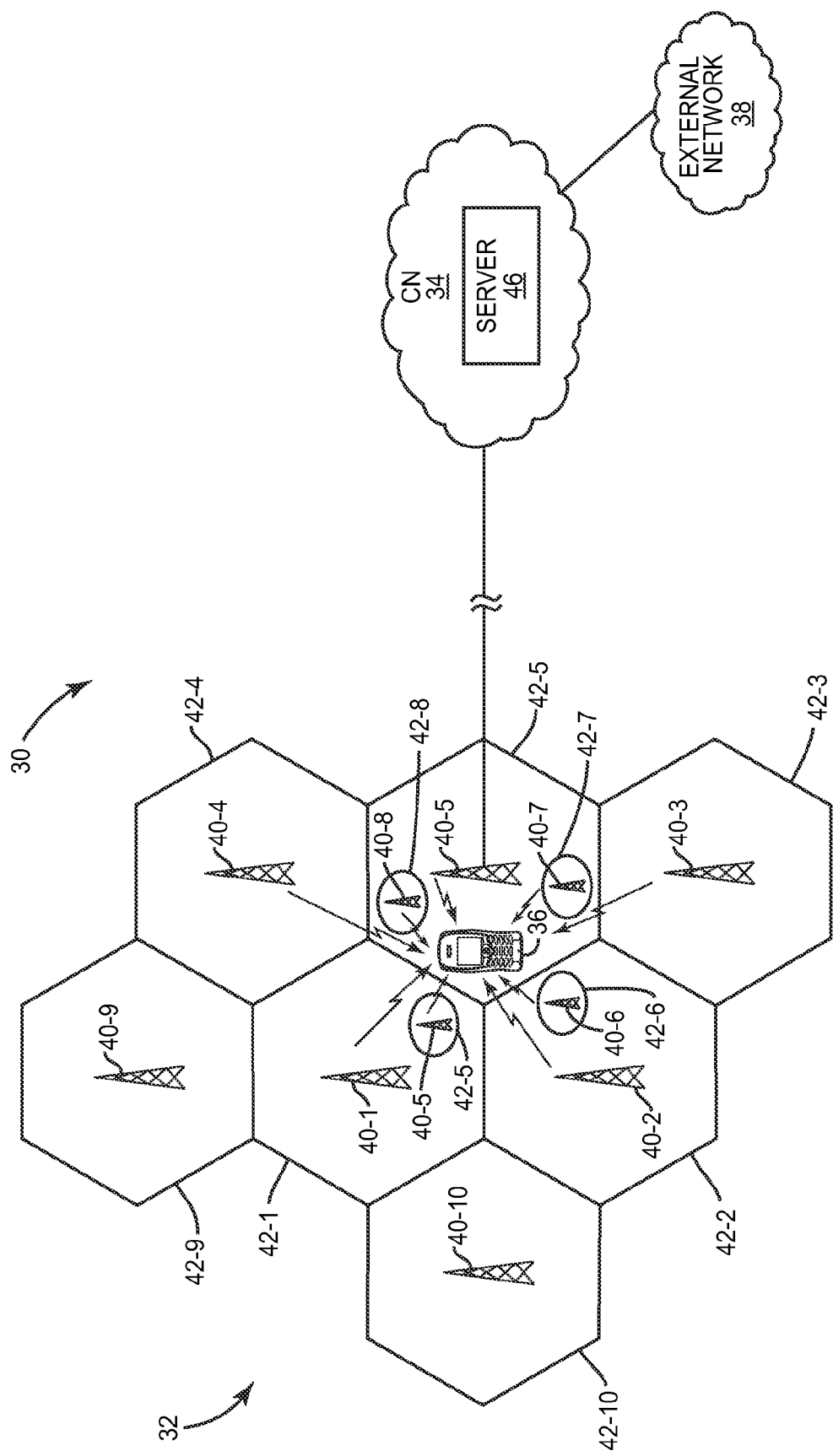
FIG. 3 is a block diagram of a wireless communication system that includes a radio network node configured according to one or more embodiments herein.

FIG. 3 depicts a simplified example of wireless communication system 30 according to one or more embodiments. As shown, the system 30 includes a Radio Access Network (RAN) 32, a Core Network (CN) 34, and one or more wireless devices 36. The RAN 32 and CN 36 enable a wireless device 36 to access one or more external networks 38, such as the Public Switched Telephone Network (PSTN) or the Internet.

The RAN 32 includes a number of base stations 40 that are geographically distributed across the wide geographic area served by the system 30. Each base station 40 provides radio coverage for one or more respective portions of that geographic area, referred to as cells 42. Because of this, a wireless device 36 may move within or between cells 42 and may communicate with one or more base stations 40 at any given position.

Different cells 42 may have different nominal sizes, depending on the maximum transmit power utilized by the base stations 40 serving those cells 42. As shown, for example, base station 40-1 has a relatively large maximum transmit power and correspondingly serves wireless devices 36 within a relatively large cell 42-1, while base station 40-5 has a relatively small maximum transmit power and correspondingly serves wireless devices 36 within a relatively small cell 40-5. In general, different base stations 40 that have different pre-defined maximum transmit powers (and thereby serve cells 42 of different nominal sizes) belong to different base station classes (e.g., a macro base station class, a micro base station class, a pico base station class, etc.).

Furthermore, different cells 42 may generally be configured to operate over different predefined bandwidths, referred to herein as cell bandwidths. A given cell 42 may transmit a signal over a bandwidth smaller than its cell bandwidth, but may not transmit a signal over a bandwidth larger than its cell bandwidth.

Within this context, FIG. 3 depicts a particular wireless device 36 that, at its current position, is served by base station 40-s in the sense that the device 36 receives data from that base station 40-s. The base station 40-s transmits this data to the device 36 on a particular frequency (referred to as the serving-cell frequency) and over a particular bandwidth (known as the serving-cell bandwidth). Thus, from the perspective of this wireless device 36, base station 40-s is the serving base station and cell 42-s is the serving cell. Other cells 42 that are geographically adjacent to or partially coincident with the serving cell 42-s are appropriately referred to as neighboring cells. In this simplified example, all cells 42 shown are neighboring cells except for cells 40-9 and 40-10.

Each of the cells 42 (via its base station 40) periodically transmits a so-called reference signal 44. A reference signal 44 as used herein is a predetermined signal that is known to both a cell 42 transmitting that signal and a wireless device 36 receiving the signal. Reference signals 44 transmitted by the cells 42 in this way can be measured by a wireless device 36. This process by which a device 36 measures reference signals 44 transmitted by a cell 42 is also referred to herein, for convenience, as a device performing measurements of that cell 42.

Regardless, a reference signal 44 may be transmitted by a cell 42 on the same or a different frequency as the serving-cell frequency. The device 36 may measure reference signals 44 transmitted by neighbor cells 42 on the serving-cell frequency at the same time as which the device 36 receives data from the serving cell 42-s on that frequency. Such measurements are appropriately referred to as intra-frequency measurements. Conversely, in at least some embodiments, the device 36 must measure reference signals 44 transmitted by neighbor cells 42 on a non-serving frequency at a different time than the time at which the device 36 receives data from the serving cell 42-s on the serving frequency. These measurements may generally be referred to herein as inter-frequency measurements, although the described embodiments are equally applicable to other measurements performed on non-serving frequencies, such as inter-RAT measurements and inter-band measurements. In any case, these measurements can then used for various purposes, including for example mobility management or determining the geographic position of the device 36.

In this regard, a wireless device 36 may establish a session with a server 46 in the core network 35 for accomplishing such a purpose. This session may include one or more transactions between the device 36 and the server 46. Each transaction pertains to a particular operation, such as the exchange of capabilities, the transfer of assistance data from the server 46 to the device 36 for assisting the device 36 to perform measurements, or the transfer of information concerning the ultimate purpose of those measurements (e.g., the actual position of the device 36). Since the device 36 performs measurements in the context of such a session, the session will be referred to herein as a measurement session of the device 36.

Within any given measurement session of a device 36, the device 36 may perform measurements of different cells 42, which may not only include neighbor cells but also the serving cell. Any one of these cells 42 may serve as a so-called reference cell in the context of the measurements. In this regard, measurements performed on the reference cell serve as a reference for measurements performed on the other cells 42.

Of particular relevance, the device 36 performs measurements of neighbor cells 42 on non-serving frequencies during so-called measurement gaps. A measurement gap as used herein refers to a period of time in which the wireless device 36 performs a measurement of a neighbor cell 42 on a non-serving frequency, and does not transmit any data or otherwise communicate with the serving cell 42-s or other cell 42 on the serving-cell frequency. Within any given measurement gap, the device 36 can perform measurements on only a limited number of non-serving frequencies (typically only one at a time).

To this end, the serving base station 40-s or some other radio network node in the RAN 32 configures (i.e., times or otherwise schedules) one or more measurement gaps during which the wireless device 36 is to perform such measurements on one or more non-serving frequencies. Notably, the base station 40-s does so intelligently, based on information obtained regarding the bandwidth(s) over which the measurements are to be performed.

Figure 4:
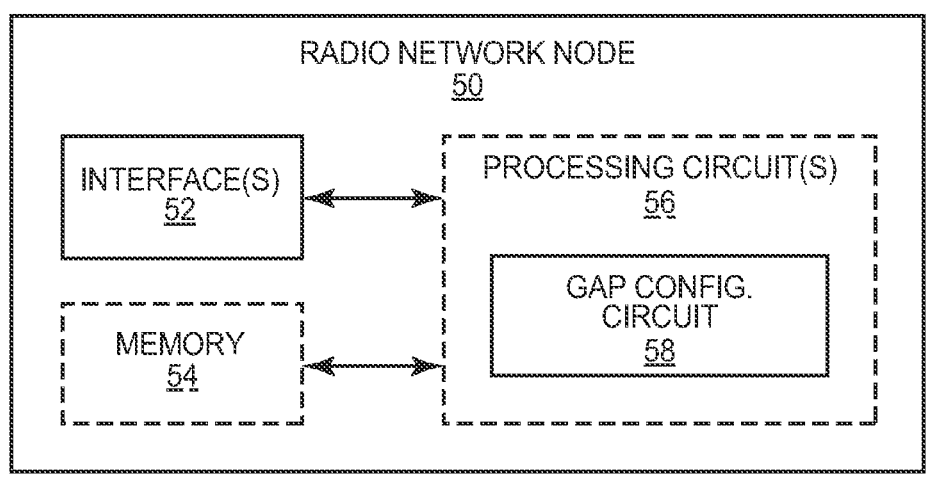
FIG. 4 is a block diagram of a radio network node configured according to one or more embodiments.

FIG. 4 illustrates additional details of such a radio network node in this regard. As shown, a radio network node 50 includes one or more communication interfaces 52, a memory 54, and one or more processing circuits 56. The one or more communication interfaces 52 may include a network interface for communicatively coupling the node 50 to other nodes in the RAN 32 or CN 34. The one or more communication interfaces 52 may further include a radio interface for communicatively coupling the node 50 to wireless devices 36.

The one or more processing circuits 56 configure the above-mentioned measurement gaps. In this regard, the one or more processing circuits 56 may functionally include a gap configuration circuit 58. As explained more fully below, the gap configuration circuit 58 is configured to obtain information that identifies, for each of a plurality of candidate non-serving frequencies, one or more measurement bandwidths over which one or more corresponding measurements on that non-serving frequency are to be performed.

In at least some embodiments, such candidate non-serving frequencies represent frequencies for which the device 36 has requested the radio network node 50 to configure measurements gaps. The gap configuration circuit 58 may therefore receive a request from the device 36 that identifies the candidate non-serving frequencies and that requests the node 50 to configure gaps for performing measurements on those identified frequencies. In this case, the gap configuration circuit 58 may obtain the above-mentioned measurement bandwidth information by retrieving that information from within the request received from the wireless device 36. Alternatively, the gap configuration circuit 58 may obtain the measurement bandwidth information by, responsive to receiving the gap configuration request from the device 36, requesting that information from server 46 or some other network node in the core network 35. Of course, other information about the cells on which measurements are to be performed may be obtained in similar ways, such as timing information regarding when the cells 42 are to transmit the reference signals 44 to be measured (e.g., a set of timing offsets, muting information, and the like).

In any case, the gap configuration circuit 58 next selects, based on the measurement bandwidths, a subset of the candidate non-serving frequencies. The gap configuration circuit 58 then configures measurement gaps during which the wireless device 36 is to perform one or more measurements on the selected non-serving frequencies. Thus, rather than configuring measurement gaps for all of the candidate non-serving frequencies, the gap configuration circuit 58 configures measurement gaps for only a subset of one or more of those non-serving frequencies. And, notably, the gap configuration circuit 58 does so intelligently based on information obtained regarding the bandwidths over which the associated measurements are to be performed.

In at least some embodiments, this configuration of measurement gaps for only a subset of candidate non-serving frequencies is necessitated because the gap configuration circuit 58 cannot configure gaps for all of those frequencies. Indeed, in these embodiments, measurement gaps are timed according to a predetermined pattern. This predetermined pattern comprises a single, periodic measurement gap pattern that defines the particular times at which a fixed number of gaps are to occur. Configuring measurement gaps thus entails specifying which candidate non-serving frequencies are to be measured during which measurement gaps, with the limitation that only a certain number (e.g., one) of non-serving frequencies can be measured during any given gap. Based on this limitation, the gap configuration circuit 58 in these embodiments determines whether or not measurement gaps can be configured for all of the candidate non-serving frequencies using the gap pattern. If so, the gap configuration circuit 58 configures the gaps accordingly, But, if not, the gap configuration circuit 58 selects and configures the gaps for a subset of candidate non-serving frequencies as described above.

Specifically, in one or more embodiments, the gap configuration circuit 58 selects the subset of candidate non-serving frequencies for which to configure measurement gaps so as to maximize the average bandwidth over which measurements will be performed. Indeed, performing measurements over a larger bandwidth in this way increases the quality and accuracy of those measurements.

In more detail, the gap configuration circuit 58 in these embodiments determines a so-called majority measurement bandwidth for each candidate non-serving frequency. A majority measurement bandwidth for a given candidate non-serving frequency, as used herein, represents the measurement bandwidth over which the majority of measurements on that non-serving frequency are to be performed. Having determined such a majority measurement bandwidth for each non-serving frequency, the gap configuration circuit 58 preferentially selects, for inclusion in the subset, candidate non-serving frequencies that have the greatest majority measurement bandwidth.

Figure 1:
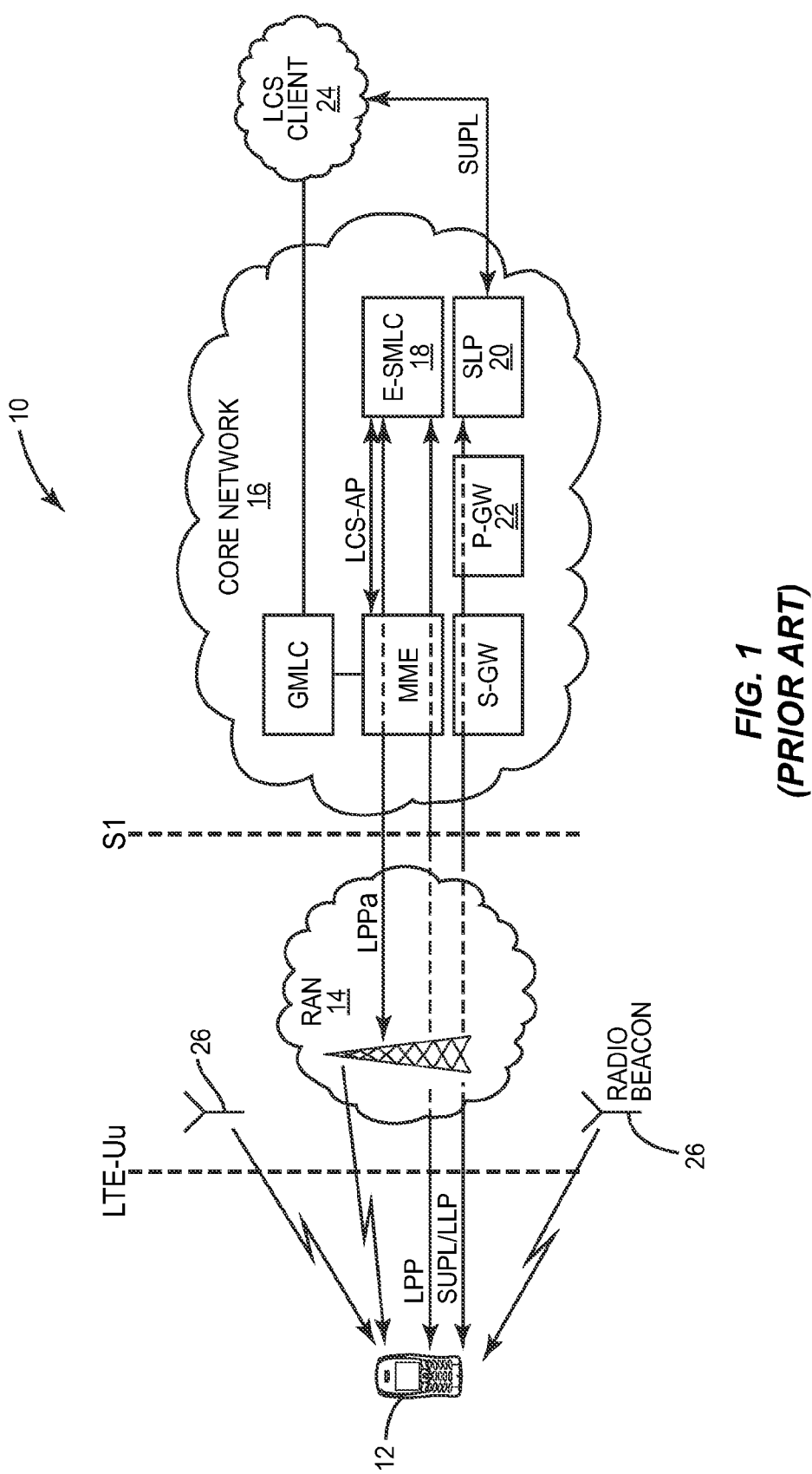
FIG. 1 illustrates components of the LTE positioning architecture.

As a simplified example, assume that the gap configuration circuit 58 receives a gap configuration request from a wireless device 36 that identifies the candidate non-serving frequencies as being F1, F2, and F3. If measurements are to be performed on F1 with respect to 4 different cells (e.g., cells 40-1 through 40-4 in FIG. 1) over respective measurement bandwidths of 5 MHz, 5 MHz, 5 MHz, and 15 MHz, the gap configuration circuit 58 determines the majority measurement bandwidth for F1 to be 5 MHz. Similarly, if measurements are to be performed on F2 with respect to those same cells 40-1 through 40-4 over respective measurement bandwidths of 5 MHz, 10 MHz, 10 MHz, and 10 MHz, the gap configuration circuit 58 determines the majority measurement bandwidth for F2 to be 10 MHz. Finally, if measurements are to be performed on F3 with respect to the cells 40-1 through 40-4 over respective measurement bandwidths of 10 MHz, 15 MHz, 15 MHz, and 15 MHz, the gap configuration circuit 58 determines the majority measurement bandwidth for F3 to be 15 MHz. Assuming the gap configuration circuit 58 can only configure measurement gaps for a subset that includes 2 of the 3 candidate non-serving frequencies F1, F2, and F3, the circuit 58 preferentially selects frequencies F2 and F3 for inclusion in the subset, because those frequencies have the greatest majority measurement bandwidths (i.e., 10 MHz and 15 MHz, as compared to 5 MHz for F1).

Note of course that there may be certain exceptions to the above selection process, e.g., to account for one or more requirements pertaining to measurement accuracy. For instance, some types of measurements (e.g., for positioning) must be performed with respect to at least a defined minimum number of cells 42. In this case, even if a particular non-serving frequency would have been selected for inclusion in the subset based on its majority measurement bandwidth, that frequency may nonetheless be excluded if measurements on the frequency cannot be performed with respect to at least the minimum number of cells.

Note also that the above embodiments selected the subset of candidate non-serving frequencies without regard to the serving-cell bandwidth. This is because the embodiments simply assume that, since the wireless device 36 will not be receiving data from the serving cell 42-s during the configured measurement gaps, the quality of data reception will not be affected by re-configuring the receiver during measurement gaps to perform measurements over a bandwidth larger than the serving-cell bandwidth (to thereby increase measurement quality). Other embodiments herein, however, advantageously recognize that the quality of data reception and/or the quality of reference signal measurements may still be affected in this case, especially if measurements of the reference cell are to be performed on the serving-cell frequency (i.e., as an intra-frequency measurement).

Thus, according to one or more embodiments, the gap configuration circuit 58 advantageously selects the subset also based on the serving-cell bandwidth, or more particularly based on the measurement bandwidths' relation to the serving-cell bandwidth. Of course, since the serving-cell bandwidth's impact is most pronounced when the reference cell transmits its reference signal on the serving-cell frequency, selection of the subset based on the serving-cell bandwidth may be conditional on that being the case. That is, in at least some embodiments, the gap configuration circuit 58 determines whether or not to select the subset also based on the serving-cell bandwidth, depending on whether or not the reference cell is on the serving-cell frequency.

In any case, when the gap configuration circuit 58 does select the subset based on the serving-cell bandwidth, the circuit 58 in some embodiments preferentially selects for inclusion in the subset candidate non-serving frequencies on which the most neighbor cells are to be measured over the serving-cell bandwidth. In the context of the above example, for instance, assume that the serving-cell bandwidth is 5 MHz. As such, the gap configuration circuit 58 determines that 3 neighbor cells on F1 are to be measured over the 5 MHz serving-cell bandwidth, 1 neighbor cell on F2 is to be measured over the 5 MHz serving-cell bandwidth, and no neighbor cells on F3 are to be measured over the 5 MHz serving-cell bandwidth. Accordingly, the gap configuration circuit 58 preferentially selects F1 and F2 for inclusion in the subset, since those non-serving frequencies have more cells that are to be measured over the serving-cell bandwidth than F3.

Other embodiments nonetheless recognize that at least some of the aforementioned advantages are realized if measurements are performed over a bandwidth that, although larger than the serving-cell bandwidth, is only larger by a defined threshold. In these embodiments, therefore, the gap configuration circuit 58 preferentially selects for inclusion in the subset candidate non-serving frequencies on which the most neighbor cells are to be measured over a bandwidth that does not exceed a defined threshold set based on the serving-cell bandwidth. Such threshold may be set, for instance, to be larger than the serving-cell bandwidth. In some embodiments, the threshold is set in this way to be a defined offset (e.g., a 5 MHz offset) or ratio (e.g., 2) from the serving-cell bandwidth (where, if the offset is 0 MHz or the ratio is just 1, this embodiment becomes equivalent in effect to the preceding embodiment). Again in the context of the above example, if the threshold is set to be either a 5 MHz offset or a ratio of 2 above the 5 MHz serving-cell bandwidth, the gap configuration circuit 58 preferentially selects for inclusion in the subset candidate non-serving frequencies on which the most neighbor cells are to be measured over a bandwidth that does not exceed 10 MHz. In this case, therefore, the gap configuration circuit 58 would again select F1 and F2 for inclusion in the subset, based on the fact that 3 cells on F1 and 4 cells on F2 are to be measured over less than a 10 MHz bandwidth, while only 1 cell on F3 is to be measured over less than a 10 MHz bandwidth.

Of course, rather than defining such a threshold explicitly in relation to the serving-cell bandwidth, the gap configuration circuit 58 may be simply configured with a defined maximum bandwidth that inherently embodies some relation to the serving-cell bandwidth. That is, in some embodiments, the gap configuration circuit 58 preferentially selects, for inclusion in the subset, candidate non-serving frequencies on which the most neighbor cells are to be measured over a measurement bandwidth that does not exceed a defined maximum bandwidth (e.g., 10 MHz). Such embodiments prove to yield similar advantages to those just described, despite not defining the maximum bandwidth explicitly with respect to the serving-cell bandwidth.

Those skilled in the art will readily appreciate that the examples herein have been simplified in a number of respects for purposes of illustration. Indeed, at least some aspects of the processing illustrated above may be performed as part of a larger set of supporting or complementary functions. In one embodiment, for instance, the radio network node 50 configures a measurement pattern for the wireless device 36 to perform the one or more measurements, where this measurement pattern indicates low-interference subframes in which the wireless device is to perform those measurements. Such a pattern may be for instance a PRS configuration, PRS muting, or eICIC measurement pattern in LTE embodiments.

Those skilled in the art will further understand that the measurements at issue in the above embodiments may be utilized for any number of different purposes, including for example mobility management or determining the geographic position of the device 36. In this latter case, a reference signal 46 herein will be specifically designed (e.g., with good signal quality) to be a signal on which a wireless device 36 performs positioning measurements. These positioning measurements are to be used by the device 36 itself, or some server 46 in the core network 34 (e.g., a positioning node), for determining the device's geographic position. In some embodiments, for example, such positioning measurements comprise timing measurements. In such a case, a wireless device 36 may measure timing differences (e.g., RSTD or Rx-TX) between different reference signals 44 received from different cells 42. These timing differences are then used to estimate the device's position with respect to the different cells 42. Of course, the above embodiments may employ any number of positioning method types besides those examples given above. Thus, positioning measurements as used herein may refer to RSTD measurements for OTDOA, RX-TX time difference measurements, timing advance measurements, received signal strength measurements, received signal quality measurements, or the like.

Still further, those skilled in the art will understand that the above mentioned reference signals 44 for which measurement gaps are configured are transmitted on non-serving frequencies. In this regard, the signals may be inter-frequency measurements, inter-RAT measurements, or inter-band measurements. The above embodiments may therefore be implemented by wireless devices 36 that need measurement gaps to perform reference signal measurements on non-serving frequencies, as well as by wireless devices 36 that do not need such gaps. Indeed, standardized operation of a device 36 may dictate that measurement gaps be configured for such measurements, even if the device 36 is technically capable of performing the measurements without them. One such device 36 may be, for instance, a device capable of carrier aggregation.

Those skilled in the art will further appreciate that the wireless device 36 described herein may be any wireless node capable of performing measurements of reference signals 44 on non-serving frequencies. In this regard, the wireless device 36 may be a mobile terminal (e.g., a smart phone, a personal digital assistant, a laptop, etc.), a sensor, a mobile relay, or even a small base station or fixed relay that performs reference signal measurements (e.g., for positioning at setup). In LTE embodiments where the measurements are utilized for positioning, for instance, the wireless device 36 comprises any LCS target.

Moreover, the above embodiments have not been described in the context of any particular type of wireless communication system (i.e., RAT). In this regard, no particular communication interface standard is necessary for practicing the present invention. That is, the wireless communication system 30 may be any one of a number of standardized system implementations in which a device 36 can perform reference signal measurements.

Nonetheless, as one particular example, the system 30 may implement LTE or LTE-based standards. In the context of positioning embodiments, therefore, the server 46 may comprise a positioning node that implements a positioning platform. If the platform is implemented in the user plane, the server 46 is an SLP node, and if the platform is implemented in the control plane, the server 46 is an E-SM LC node. Moreover, signaling of the positioning result between an E-SM LC node and an LCS Client may be transferred via multiple nodes (e.g., via MME and GMLC). Note also that LTE FDD and LTE TDD are considered as different RATs, and two LTE networks are also considered as two different LTE RATs. Finally, reference signals 44 as referred to above may comprise Positioning Reference Signals (PRS) in LTE positioning embodiments.

At least in this case, the bandwidth over which PRS are transmitted (i.e., PRS transmission bandwidth) and/or measured (i.e., PRS measurement bandwidth) may be made available either in a radio node in the RAN 32, a positioning node 46 in the CN 34, or another network node (e.g., O&M or SON), and then communicated between the nodes directly or via other nodes (e.g., eNodeB may communicate with positioning node via O&M). The communication may also be between eNodeBs, e.g., over X2. The communication comprises at least PRS transmission bandwidth and/or PRS measurement bandwidth and/or other PRS information (e.g., any combination of: muting information, number of subframes, PRS periodicity, PRS offset from SFN0, or e.g. pico PRS subframe offset from a macro cell in the area).

Of course, those skilled in the art will appreciate that the various "circuits" described may refer to a combination of analog and digital circuits, and/or one or more processors configured with software stored in memory 54 and/or firmware stored in memory 54 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 5:
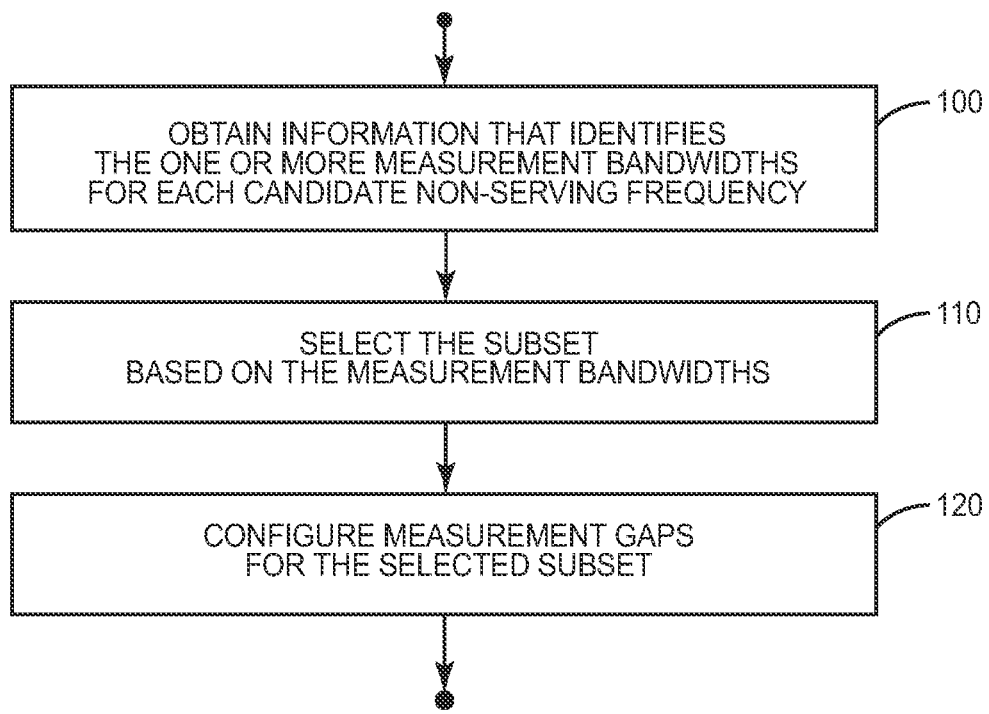
FIG. 5 is a logic flow diagram of a method implemented by a radio network node for configuring measurement gaps during which a wireless device is to perform measurements of one or more neighbor cells on one or more non-serving frequencies, according to one or more embodiments.

In view of the above modifications and variations, those skilled in the art will appreciate that the radio network node 50 described herein generally performs the processing shown in FIG. 5 for configuring measurement gaps during which a wireless device 36 is to perform measurements of one or more neighbor cells 42 on one or more non-serving frequencies. As shown in FIG. 5, processing includes obtaining information that identifies, for each of a plurality of candidate non-serving frequencies, one or more measurement bandwidths over which one or more corresponding measurements on that non-serving frequency are to be performed (Block 100). Processing further entails selecting a subset of the candidate non-serving frequencies based on those measurement bandwidths. (Block 110). Finally, processing includes configuring measurement gaps during which the wireless device 36 is to perform one or more measurements on the selected non-serving frequencies (Block 120).

Those skilled in the art will nonetheless recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method of configuring measurement gaps during which a wireless device is to perform one or more measurements of one or more neighbor cells on one or more non-serving frequencies, the method comprising:
   obtaining information that identifies, for each of a plurality of candidate non-serving frequencies, one or more measurement bandwidths over which one or more corresponding measurements on that non-serving frequency are to be performed;
   selecting a subset of the candidate non-serving frequencies based on the measurement bandwidths;

configuring measurement gaps during which the wireless device is to perform one or more measurements on the selected non-serving frequencies.

2. The method of claim 1, wherein:
the wireless device is configured to receive or measure signals from a serving cell over a serving-cell bandwidth;
the selecting comprises selecting the subset based on the measurement bandwidths in relation to the serving-cell bandwidth.

3. The method of claim 2, wherein the selecting comprises preferentially selecting, for inclusion in the subset, candidate non-serving frequencies on which the most neighbor cells are to be measured over a measurement bandwidth that does not exceed a defined threshold set based on the serving-cell bandwidth.

4. The method of claim 3, wherein the defined threshold is set to be larger than the serving-cell bandwidth.

5. The method of claim 2, wherein the selecting comprises preferentially selecting, for inclusion in the subset, candidate non-serving frequencies on which the most neighbor cells are to be measured over a bandwidth equal to the serving-cell bandwidth.

6. The method of claim 1, wherein:
the wireless device is configured to receive or measure signals from a serving cell on a serving-cell frequency over a serving-cell bandwidth;
measurements on a reference cell serve as a reference for the measurements;
the method further comprises determining whether or not to select the subset also based on the serving-cell bandwidth, depending on whether or not the reference cell is on the serving-cell frequency.

7. The method of claim 1, wherein the selecting comprises preferentially selecting, for inclusion in the subset, candidate non-serving frequencies on which the most neighbor cells are to be measured over a measurement bandwidth that does not exceed a defined maximum bandwidth.

8. The method of claim 1, wherein the selecting comprises:
determining a majority measurement bandwidth for each candidate non-serving frequency, wherein the majority measurement bandwidth for a given candidate non-serving frequency is the measurement bandwidth over which the majority of measurements on that non-serving frequency are to be performed; and
preferentially selecting, for inclusion in the subset, candidate non-serving frequencies that have the greatest majority measurement bandwidth.

9. The method of claim 1, wherein the selecting and configuring are performed responsive to determining that measurement gaps cannot be configured using a single measurement gap pattern for performing measurements on all of the candidate non-serving frequencies.

10. The method of claim 1, wherein the obtaining, selecting, and configuring are performed responsive to receiving, from the wireless device, a request that identifies the candidate non-serving frequencies and that requests configuration of the measurement gaps.

11. The method of claim 1, wherein the measurements comprise positioning measurements that are to be used for determining the geographic position of the wireless device.

12. The method of claim 11, wherein:
the method is implemented in a Long Term Evolution (LTE) network;
the positioning measurements are performed on Positioning Reference Signals (PRS).

13. The method of claim 11, wherein the positioning measurements comprise any one or more of:
Reference Signal Time Difference (RSTD) measurements for Observed Time Difference of Arrival (OTDOA);
Receive-Transmit (Rx-Tx) time difference measurements;
Timing Advance (TA) measurements;
received signal strength measurements;
received signal quality measurements.

14. The method of claim 1:
wherein the one or more measurements comprise one or more of:
intra-frequency measurements;
inter-frequency measurements;
intra-RAT measurements;
inter-RAT measurements;
wherein an inter-frequency or inter-RAT measurement comprises either an intra-band measurement or an inter-band measurement.

15. The method of claim 1, wherein the wireless device requires measurement gaps in order to perform the one or more measurements on the one or more non-serving frequencies.

16. The method of claim 1, wherein:
the method further comprises configuring a measurement pattern for the wireless device to perform the one or more measurements;
the measurement pattern indicates low-interference subframes in which the wireless device is to perform the measurements.

17. A radio network node for configuring measurement gaps during which a wireless device is to perform one or more measurements of one or more neighbor cells on one or more non-serving frequencies, the radio network node comprising:
a communications interface;
one or more processing circuits operatively connected to the communications interface;
wherein the one or more processing circuits are configured to cause the network node to:
obtain information that identifies, for each of a plurality of candidate non-serving frequencies, one or more measurement bandwidths over which one or more corresponding measurements on that non-serving frequency are to be performed;
select a subset of the candidate non-serving frequencies based on the measurement bandwidths;
configure measurement gaps during which the wireless device is to perform one or more measurements on the selected non-serving frequencies.

\* \* \* \* \*